United States Patent
Carlson

[15] 3,652,171
[45] Mar. 28, 1972

[54] BUTTER APPLICATOR
[72] Inventor: John W. Carlson, 6678 S. Acoma, Littleton, Colo. 80120
[22] Filed: May 6, 1970
[21] Appl. No.: 35,070

[52] U.S. Cl. ..................................................401/12
[51] Int. Cl. ...................................................A23p 1/00
[58] Field of Search..................................401/12

[56] References Cited

UNITED STATES PATENTS

Des. 157,183  2/1950  Newell.....................................401/12
3,005,225  10/1961  Faust et al. ...........................401/12

Primary Examiner—Robert W. Michell
Attorney—Vincent L. Carney

[57] ABSTRACT

Two of the four parallel side walls of the butter applicator have arcuate edges to receive the surface of an ear of corn and have ledges extending inwardly and downwardly from their top edges, which ledges extend across the space between the other two parallel side walls and stop short of each other to define a slot adjacent to the surface of the ear of corn. To butter the ear of corn, the butter applicator is placed upon it with the arcuate edges of the two parallel side walls straddling the ear of corn and a pat of butter is placed in its upper end so that it slides downward with its edge contacting the surface of the ear of corn along the slot whereby the surface of the corn may be buttered by moving the butter applicator back and forth in the direction of the longitudinal axis of the ear of corn.

7 Claims, 6 Drawing Figures

PATENTED MAR 28 1972

3,652,171

Inventor
John W. Carlson
by Fidler, Bradley, Patnaude & Lazo
Atty's

BUTTER APPLICATOR

This invention relates to butter applicators and more particularly to butter applicators for buttering corn-on-the-cob.

One type of butter applicator is in the form of a receptacle having four side walls, two of which have arcuate bottom edges that are adapted to rest upon an ear of corn that is to be buttered. This type of butter applicator includes at least one aperture in its bottom surface that butter placed within the butter applicator is melted by heat from the ear of corn. The melted butter then flows upon the surface of the ear of corn to butter it.

In one prior art butter applicator of this type, the top of the butter applicator may be opened and a pat of butter deposited therein. The bottom surface of the butter applicator is curved and includes a plurality of apertures through which the butter flows as it melts.

This type of prior art butter applicator has a disadvantage in that aperture in the curved bottom of the butter applicator cause difficulty. The apertures become clogged and are difficult to keep clean. Moreover, the butter applicators of this type are somewhat difficult to form of plastic by molding because a large number of small pins are required in one of the dies, which pins are subject to damage during the molding operation.

Another prior art butter applicator of this type has a closed top and an opening in at least one side to receive a large stick of butter. The bottom surface of the butter applicator includes a slot extending along the length of the butter applicator in a direction orthogonal to the arcuate bottom edges to be parallel to the longitudinal axis of an ear of corn.

This type of prior art butter applicator has two primary disadvantages, which are: (1) it is relatively large since it must accommodate an entire stick of butter and this makes it expensive and difficult to handle and (2) it is difficult to insert the butter because it does not have an open top.

Accordingly, it is an object of this invention to provide a novel butter applicator.

It is a further object of the invention to provide a butter applicator especially suitable for buttering corn-on-the-cob.

It is a still further object of this invention to provide a butter applicator having an open top to receive a pat of butter.

It is a still further object of this invention to provide a butter applicator that may be inexpensively formed.

It is a still further object of this invention to provide a butter applicator which is relatively small in size and can nevertheless be used to quickly butter an ear of corn.

In accordance with the above and further objects of the invention, a butter applicator is provided having four side walls and an open top and bottom. Two of the side walls are parallel to each other and include arcuate bottom edges adapted to straddle an ear of corn, with two connecting side walls connecting the edges transverse to the first-mentioned side walls. A different inwardly and downwardly extending ledge is connected to the top edge of each of the two parallel side walls, with the ledges extending across the space between the connecting side walls and stopping short of each other to define a slot in the bottom of the butter applicator which slot is located higher than the apex of the curves of the two arcuate edges. The butter applicator is made of plastic by injection molding and is of appropriate size to accommodate a single pat of butter.

To use the butter applicator, it is first placed upon an ear of corn with the arcuate edges of the parallel side walls straddling the ear of corn. A pat of butter is then placed in the open top so that it slides downwardly on one of the ledges until its edge abuts the ear of corn. The butter applicator is then moved back and forth in a direction parallel to the longitudinal axis of the ear of corn whereby the butter melts and is spread upon the corn. The ear of corn may be turned and butter spread across the different longitudinal surface until the ear of corn is fully buttered.

The above noted and other features of the invention will be better understood from the following detailed description when considered in connection with the accompanying drawings in which.

Figure 1:
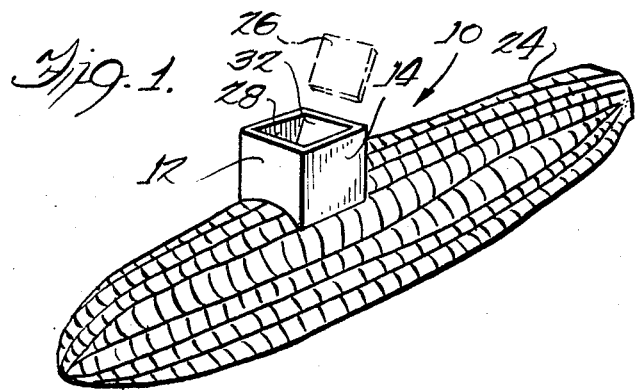
FIG. 1 is a perspective view of a butter applicator constructed in accordance with the invention shown as it is used to butter a cob of corn.
Figure 2:
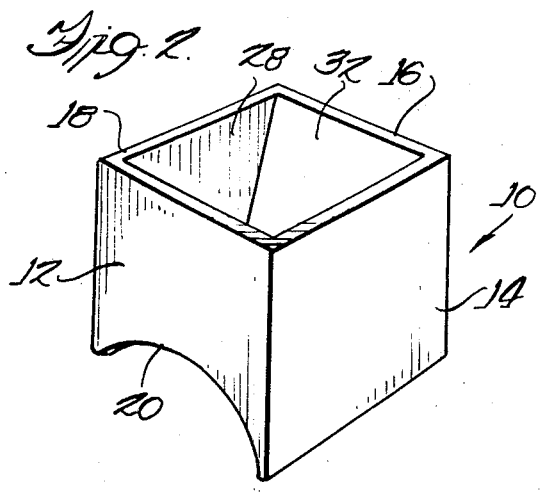
FIG. 2 is a perspective view of the butter applicator of FIG. 1 without the ear of corn.
Figure 3:
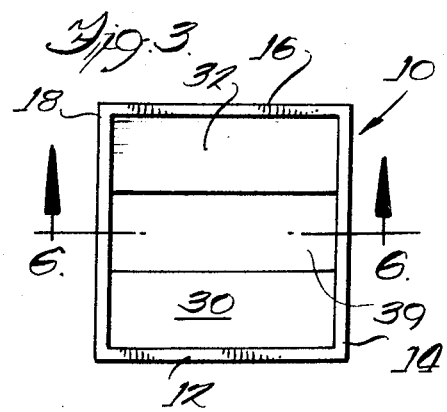
FIG. 3 is a plan view of the butter applicator.
Figure 4:
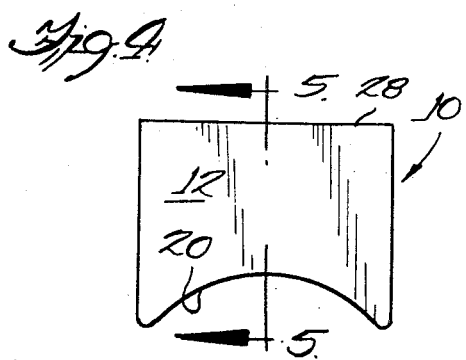
FIG. 4 is a side view of the butter applicator.

As best shown in the perspective views of FIGS. 1 and 2, the butter applicator 10 is generally in the shape of a parallelepiped having four side walls 12, 14, 16, and 18 with the side walls 12 and 16 being parallel to each other and having their ends connected by the mutually parallel transversely extending side walls 14 and 18. The parallel side walls 12 and 16 each include one of the arcuate edge surfaces 20 and 22 (FIG. 6) adapted to receive an ear of corn such as 24 shown in FIGS. 1 and 5.

To receive a pat of butter 26 (FIGS. 1 and 5) the butter applicator 10 has an open top 28. Within the butter applicator 10 is a first inwardly and downwardly extending ledge 30 attached at its upper end to the side wall 12 adjacent to the opening 28 and an inwardly and downwardly turned ledge 32 attached at its upper end to the side wall 16 adjacent to the open end 28. The ledges 30 and 32 extend across the space between the parallel walls 14 and 18 to which they are transverse and stop short of each other at their lower ends to define a slot 34 extending between the parallel walls 14 and 18 at a location level with the top of the curved surfaces 20 and 22 so as to be adjacent to the ear of corn when the butter applicator is in use.

The entire butter applicator 10 may be formed of any suitable plastic in a single injection molding operation with very little labor. It is of sufficient size to accommodate a single pat of butter and is relatively small compared to a typical ear of corn. Generally it is preferred that it occupy a space of less than 5 cubic inches for convenient handling and storage. In the preferred embodiment the butter applicator 10 is 1¾×1¾×1⅜ inches with each side wall being 1¾×1⅜ inches so that the height of the butter applicator is approximately 1⅜ inches. The slot 34 is 9/16 inches wide and located ⅜ inches from the bottom of the butter applicator 10. The edges 20 and 22 have a 1 inch radius of curvature and extend ⅜ inches from the bottom of the butter applicator 10.

Figure 5:
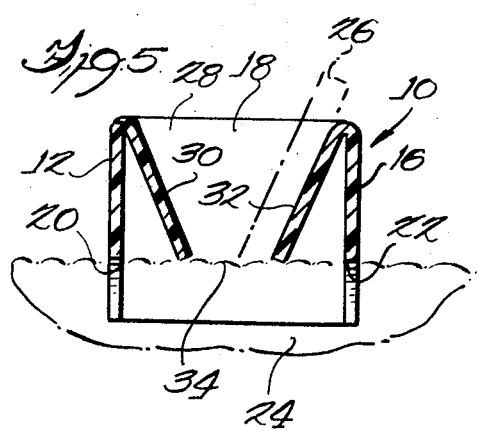
FIG. 5 is a sectional view of the butter applicator taken along lines 5—5 of FIG. 4.
Figure 6:
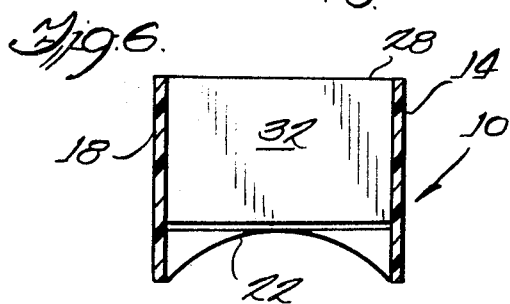
FIG. 6 is a sectional view of the butter applicator taken along lines 6—6 of FIG. 3.

In operation, the butter applicator 10 is mounted to an ear of corn such as 24 shown in FIG. 1 with the arcuate edges 20 and 22 of the side walls 12 and 16 receiving the curved surface of the ear of corn 24. The pat of butter 26 is then deposited in the open top 28 whereupon it rests upon one of the inwardly and downwardly turned edges 30 or 32 as shown in FIG. 5 with the edge of the pat of butter 26 abutting the surface of the ear of corn 24.

The butter applicator 10 is then moved along the top surface of the ear of corn so that the butter is spread evenly along its surface. When one longitudinal portion of the surface of the ear of corn has been buttered, the ear of corn is turned while maintaining the butter applicator 10 stationary until a fresh surface is beneath the slot 34. The butter applicator 10 is then again moved along the lateral surface of the ear of corn to butter a new portion of it.

Because the butter applicator 10 is made of plastic in one piece, it may be made in quantities by injection molding, thus enabling it to be inexpensively produced. There are no small apertures in the butter applicator 10 and therefore there is no need for a large number of molding pins which are expensive and sometimes broken in the molding apparatus.

Since the top 28 of the butter applicator 10 is open, it is easy to deposit a pat of butter 26 into it. Since the slot 34 extends orthogonally to the longitudinal axis of the ear of corn when the butter applicator 10 is mounted upon the surface of the ear of corn, the slot covers a wide area and the butter applicator may be moved back and forth longitudinally to cover this area. In this manner an ear of corn is quickly and conveniently buttered without the necessity of an expensive and difficult to handle butter applicator that extends across the entire length of the ear of corn and has a slot along its length.

Although a specific embodiment of the invention has been described with some particularity, many modifications and variations in the embodiment are possible in the light of the above teachings. Therefore, it is to be understood that, within the scope of the appended claims, the invention may be practiced otherwise than as specifically described.

What is claimed is:

1. A butter applicator comprising a receptacle having an open top, said receptacle including:
   an elongated slot in its bottom surface;
   a first side wall having a first top edge;
   a second side wall parallel to said first side wall and having a second top edge;
   a first inwardly and downwardly extending ledge attached to said first top edge; and
   a second inwardly and downwardly extending ledge attached to the second top edge;
   said first and second ledges defining said slot between their distal edges.

2. A butter applicator according to claim 1 in which said first and second parallel side walls each include a different arcuate bottom edge adapted to straddle an ear of corn.

3. A butter applicator according to claim 2 in which said corn butter applicator occupies a space of less than 5 cubic inches.

4. A butter applicator according to claim 3 and further comprising third and forth parallel side walls connecting the side edges of said first-mentioned two parallel side walls and extending transverse thereto.

5. A butter applicator according to claim 4 which comprises a plastic material of uniform composition.

6. A butter applicator according to claim 5 having a height of approximately 1¾ inches.

7. A butter applicator according to claim 5 in which the side walls each have a width of approximately 1¾ inches.

* * * * *